United States Patent
Hähle et al.

(10) Patent No.: US 8,076,878 B2
(45) Date of Patent: Dec. 13, 2011

(54) TRACTION DRIVE OF A RAIL VEHICLE FOR DRIVING AND GENERATIVE BRAKING WITH LOAD CORRECTION

(75) Inventors: Falk Hähle, Germering (DE); Ulf Friesen, Neubiberg (DE); Josef Schmucker, Pullach (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 330 days.

(21) Appl. No.: 12/447,713

(22) PCT Filed: Oct. 25, 2007

(86) PCT No.: PCT/EP2007/009259
§ 371 (c)(1),
(2), (4) Date: Apr. 29, 2009

(87) PCT Pub. No.: WO2008/052694
PCT Pub. Date: May 8, 2008

(65) Prior Publication Data
US 2010/0066282 A1    Mar. 18, 2010

(30) Foreign Application Priority Data
Oct. 31, 2006  (DE) .......................... 10 2006 051 319

(51) Int. Cl.
*H02P 3/14*    (2006.01)
(52) U.S. Cl. ........ 318/376; 318/377; 318/378; 318/379; 318/380; 318/381
(58) Field of Classification Search ........... 318/376–381
See application file for complete search history.

(56) References Cited

U.S. PATENT DOCUMENTS
2004/0222761 A1*  11/2004  Jockel ........................... 318/376

FOREIGN PATENT DOCUMENTS
DE        101 60 612 A1    6/2003
(Continued)

OTHER PUBLICATIONS

International Search Report for International Application No. PCT/EP2007/009259.
Dietmar Goebel: "Bremsen für Personen-Nahverkehrsmittel", nahververkehrs-praxis, vol. May 1982, pp. 191 to 194.
English Translation of a Chinese Office Action, Chinese Patent Application No. 200780040906.4 Dated Apr. 20, 2011.

*Primary Examiner* — Thomas Dougherty
(74) *Attorney, Agent, or Firm* — Barnes & Thornburg LLP

(57) ABSTRACT

The invention relates to a traction drive for the driving and generative braking of a rail vehicle or a combination of rail vehicles, at least one permanent-field synchronous motor and a traction current converter being associated with at least one axle of the rail vehicle or combination of rail vehicles. The traction current converter includes at least one pulse current converter on the engine side, and the clamps of the permanent-field synchronous motor are connected to a change-over switch such that the permanent-field synchronous motor can be connected to a load circuit forming a load, to drive the pulse current converter or for generative braking. According to the invention, the load circuit connected to the permanent-field synchronous motor for generative braking is designed and/or controlled in such a way that the characteristic values of the load circuit can be modified according to the loading of the rail vehicle or combination of rail vehicles.

12 Claims, 3 Drawing Sheets

FOREIGN PATENT DOCUMENTS

| | | |
|---|---|---|
| DE | 102 36 246 | 6/2005 |
| DE | 10 2004 032679 A1 | 2/2006 |
| DE | 10 2004 032680 A1 | 2/2006 |
| EP | 0 704 961 | 4/1996 |
| EP | 1 520 829 A1 | 4/2005 |
| WO | WO 03/050940 | 6/2003 |

* cited by examiner

TRACTION DRIVE OF A RAIL VEHICLE FOR DRIVING AND GENERATIVE BRAKING WITH LOAD CORRECTION

CROSS-REFERENCE TO RELATED APPLICATIONS

The present application claims the benefit of priority to International Application No. PCT/EP2007/009259 filed 25 Oct. 2007, which claims priority to German Patent Application No. 10 2006 051 319.3 filed 31 Oct. 2006, the contents of which are incorporated herein by reference in their entirety.

BACKGROUND

The invention is based on a traction drive for driving and for performing regenerative braking of a rail vehicle or of a combination of rail vehicles, wherein at least one permanently excited synchronous motor and one traction current converter are assigned to at least one axle of the rail vehicle or of the combination of rail vehicles, and wherein the traction current converter has at least one machine-side pulse current converter, and the permanently excited synchronous motor is connected at its terminals to a changeover switch in such a way that the permanently excited synchronous motor can be connected to the pulse current converter to perform driving or to a load circuit containing a load to perform regenerative braking. The invention is also based on a device for correcting loads during the regenerative braking of rail vehicles or combinations of rail vehicles containing an air spring device with at least one air spring bellows, by means of a traction drive.

The objective when equipping rail vehicles is to use ever more effective and lightweight drive machines. Conventionally, inverter-fed asynchronous machines are used as the standard drive machine. However, these machines offer little potential for further development in terms of reducing their mass and torque density; when used in rail vehicles such machines usually require a transmission. Accordingly, increasing efforts are currently being made to develop and use permanently excited synchronous machines as vehicle drives.

By virtue of its high torque density, this type of machine permits direct drives to be implemented and particularly the elimination of the transmission means that it allows the mass of the drive train to be reduced to a very high degree.

Permanently excited synchronous machines have a number of unique features compared to asynchronous technology owing to their permanent excitation. Therefore, it is possible, for example, in the case of a rotating machine, to achieve a braking effect in addition to the inverter-regulated generator mode using purely passive components. The braking effect achieved by a permanently excited synchronous machine by connecting braking resistors is known from DE 101 60 612, which defines the generic type.

When the rotating, permanently excited synchronous machine with braking resistors is connected into the circuit, a characteristic torque curve or characteristic force curve (also referred to herein as a natural braking characteristic curve) is obtained as a function of the rotational speed of the synchronous motor and, therefore, also of the speed of the vehicle. This braking characteristic curve has a profile maximum value when plotted against the rotational speed/speed.

SUMMARY

When the regenerative braking effect of a permanently excited synchronous motor is applied, it would be desirable to control the braking force or the braking torque as a function of the load.

The invention is therefore based on the object of developing a traction drive of the above-mentioned type in such a way that load-dependent adaptation of the braking force is possible in a simple and cost-effective way. Furthermore, the intention is to make available a corresponding device for correcting loads.

According to the invention, the load circuits connected to the permanently excited synchronous motors to perform regenerative braking are embodied and/or controlled in such a way that the characteristic variables of the load circuit can be changed as a function of the loading of the rail vehicle or of the combination of rail vehicles. This interrelationship is based on the realization that the braking characteristic curve of a permanently excited synchronous motor can be changed in terms of the position and level of the maximum braking torque by varying the load circuit. For example, at relatively low braking resistance values, the maximum braking torque is displaced in the direction of relatively low rotational speeds without the value of the maximum braking torque changing.

Conversely, at relatively high braking resistance values, the maximum braking torque is displaced in the direction of relatively high rotational speeds. The maximum braking torque can be increased by connecting capacitors in parallel with respect to the braking resistors. In contrast, inductors, which are connected in series with respect to the braking resistors bring about a reduction in the maximum braking torque. By correspondingly connecting the load elements, it is possible to adapt the natural braking characteristic curve in accordance with the respective requirements which arise due to changes in load. This generally means that when relatively high loading occurs, a relatively large braking force or a relatively large braking torque is required; conversely, when relatively low loading occurs, a relatively small braking force or a relatively small braking torque is required.

Such loading-dependent variation of the load circuit does not require complex regulating means and can be implemented cost-effectively as a simple controller.

Advantageous developments and improvements of the invention specified in the independent claims are possible by virtue of the measures specified in the dependent claims.

A device for correcting loads during the regenerative braking of rail vehicles or combinations of rail vehicles by means of a traction drive can generally include the following assemblies: a load-sensing device for generating loading-dependent load signals as well as a transmission device or control device for processing the load signals and for modulating actuating signals for at least one actuator for switching over or adjusting the load elements of the load circuit (resistors, capacitors and inductors) as a function of the load signals.

The load-sensing device can include mechanical, pneumatic and also electrical devices including mechanical devices such as spring-compression-dependent linkages. The load signal or the measurement variable is then formed by the spring compression travel or spring compression angle. The load-sensing device can also include pneumatic devices such as force-dependent or pressure-dependent weighing valves or, alternatively, only the air spring pressure in air spring bellows of an air spring device of the rail vehicle. The load signal or the measurement variable is then formed by the pressure. Electrical devices such as spring-compression-dependent potentiometers may also be used in the load-sensing device. The load signal or the measurement variable is then formed by the resistance, the current or the voltage, a capacitance, an inductance or field strength.

Selection of the type of transmission device or control device depends on the generic type of the load-sensing device and can be mechanical, for example, formed by linkages, levers, pneumatic, for example, formed by pneumatic lines, pressure converters, pneumatic boosting valves, or electrical, for example, formed by electrical lines, amplifiers.

The actuator for switching over or adjusting the load elements can contain corresponding switching elements for incrementally switching over or connecting into the circuit passive load elements, such as mechanically or pneumatically activated switching contacts, electromechanical contactors, electrical/electronic switches, for example thyristors or transistors. The actuator may also contain corresponding actuating elements for continuous or infinitely variable changing of values of the passive load elements (e.g., resistors, inductors, capacitors), which actuating elements bring about, for example, a change in the characteristic values of the magnetic circuit of the inductor by displacing a coil core to change the air gap in the coil core or a change in the resistance values by means of sliders.

A particularly simple and cost-effective design is obtained if, within the scope of the sensing of loads, only the bellows pressure prevailing in air spring bellows of an air spring device of the rail vehicle or combination of rail vehicles is used as the load signal and is fed directly as an actuating signal into a pneumatic pressure switch for incremental switching over or connecting into the circuit of load elements, or is fed into a pneumatic actuator for continuous or infinitely variable adaptation of values of the passive load elements. In the second case, the pneumatic actuator adjusts, for example, one or more coil cores of the inductors.

To implement such an embodiment, the load circuit may have, for example, resistors, inductors and/or capacitors that can be connected or disconnected with respect to the resistors by means of the actuator. Alternatively, resistors, inductors or capacitors on which closed-loop or open-loop control can be carried out in an infinitely variable fashion are also conceivable; these load elements may be adjusted by the actuator as a function of the loading.

According to one embodiment, the load circuit has resistors and inductors arranged in series with respect to the resistors, wherein the transmission device or control device controls at least one actuator as a function of the loading in such a way that the actuator reduces the inductance as the loading increases and increases the inductance as the loading decreases.

According to the rules already described above, an increase of an inductance connected in series with a braking resistor, even from zero, leads to a reduction in the maximum braking torque; conversely, a reduction in the inductance results in an increase in the maximum braking torque.

In an apparently contradictory way, the development of the invention proposes that when the load is low or when a rail vehicle is empty, braking should be carried out with a relatively low braking torque (compared to a high maximum braking torque which can theoretically be used) and the braking torque should not be increased; this may be done by reducing the inductance until the rail vehicle or the combination of rail vehicles is loaded. An advantage of this procedure is, on the one hand, that a constant deceleration of the rail vehicle is desirable irrespective of the state of loading. This means, with respect to the relationship $F=m \times a$, that as the load m decreases with a constant deceleration a, the braking force F has to be reduced; this is achieved by increasing the inductance.

On the other hand, even if higher decelerations were to be permitted even when a rail vehicle is unladen, the coefficient of friction (present between the wheels and the rail and reduced by moisture or foliage located on the rails) generally does not permit a correspondingly high braking force to be transmitted to the rails in conjunction with the normal force (which is then reduced without the occurrence of a relatively high slip deviating from an optimum slip). For safety reasons, poor conditions with coefficients of friction of 0.10 to 0.12, but at maximum 0.15, are always assumed for braking calculations. Consequently, in the case of a vehicle which has low loading or is unladen, the approach of braking with a braking torque lower than the potentially possible braking torque and braking with the maximum possible braking torque only when a vehicle is laden is appropriate.

The inductors may contain magnetic coils, wherein a pneumatically activated actuator changes, for example, the magnetic circuit of the inductors; this may be done by, for example, infinitely variable adaptation of the position of their coil cores to adapt the inductors as a function of the loading.

Alternatively, the pneumatically activated actuator can be formed by a pressure switch controlled by the pressure in the at least one air spring bellows and can connect or disconnect the inductors or capacitors with respect to the resistors as a function of the loading.

According to one development, the regenerative brake, based on the permanently excited synchronous motor, forms a safety brake or emergency brake that is subordinate to a service brake as a protection level. To implement the safety brake or emergency brake, the regenerative brake can interact with a safety loop of the rail vehicle or of the combination of rail vehicles in such a way that, after a variable conducted along the safety loop has exceeded or undershot a limiting value, the permanently excited synchronous motor is connected to the load circuit. The invention then permits loads on the safety brake or emergency brake to be corrected in a very simple and cost-effective way.

BRIEF DESCRIPTION OF THE FIGURES

Exemplary embodiments of the invention are illustrated in the figures and explained in more detail in the following description. In the figures.

DESCRIPTION OF EXEMPLARY EMBODIMENTS

Figure 1:
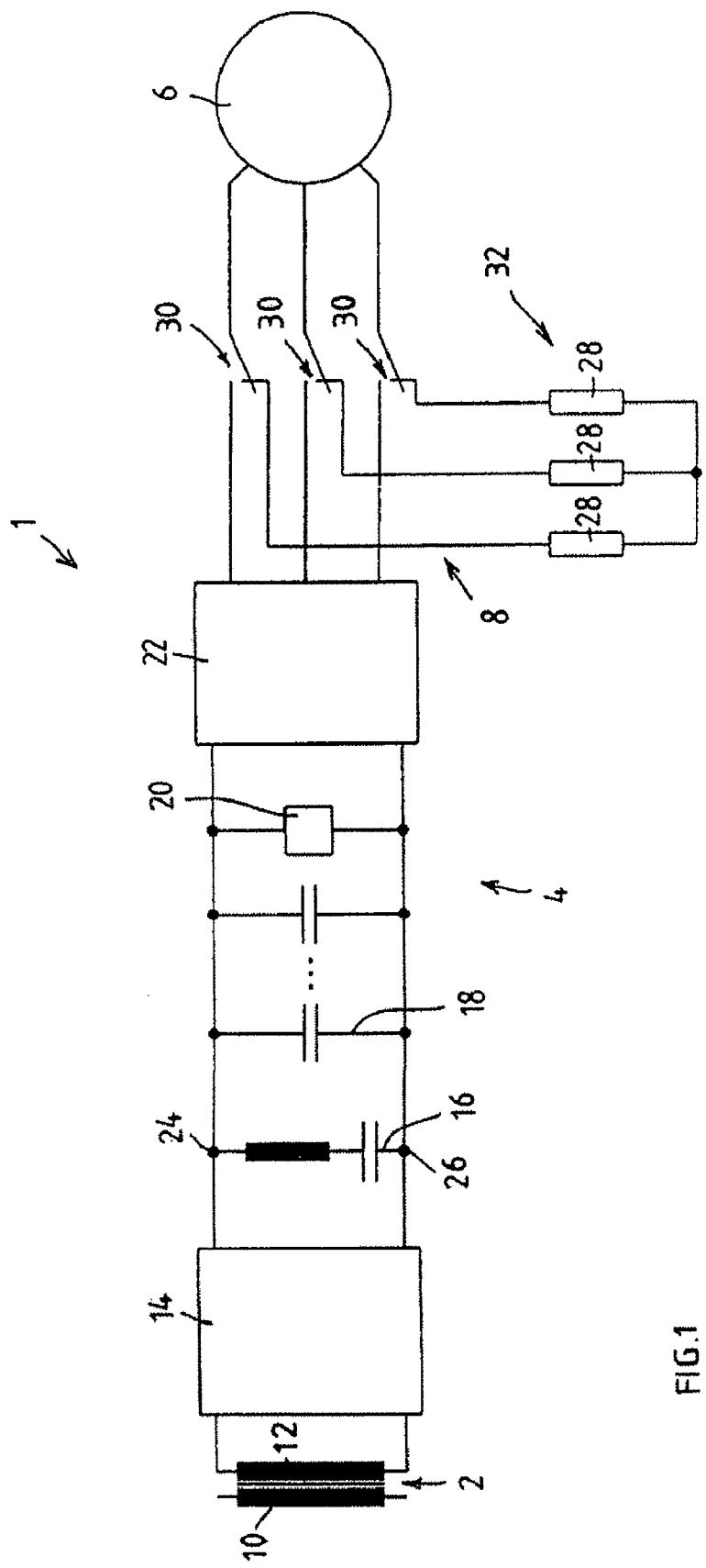
FIG. 1 is a schematic illustration of a traction drive for an alternating current vehicle.

In FIG. 1 illustrates a traction drive 1 for an alternating current vehicle, also referred to as an AC rail vehicle. In FIG. 1, a traction transformer is denoted by 2, a traction current converter by 4, a permanently excited synchronous motor by 6 and a brake device by 8. The traction transformer 2 has a primary winding 10 and a plurality of secondary windings 12, of which only one secondary winding 12 is illustrated. The traction current converter 4 has a four quadrant chopper 14, an absorption circuit 16, a capacitor battery 18, an overvoltage protection device 20 and a machine-side pulse current converter 22. The four quadrant chopper 14 is linked on the alternating voltage side to the secondary winding 12 of the traction transformer 2 and is connected electrically in parallel on the direct voltage side. The absorption circuit 16, the capacitor battery 18, the overvoltage protection device 20 and the direct-voltage-side input connections of the machine-side pulse current converter 22 are connected electrically parallel to the two direct-voltage-side connections 24 and 26 of this feed circuit. On the output side, the machine-side pulse current converter 22 can be connected to connections of the permanently excited synchronous motor 6.

The brake device 8 is composed, per phase, of the permanently excited synchronous motor 6, of a braking resistor 28 and a changeover switch 30. These braking resistors 28 are connected electrically in, for example, a star configuration and each have, for example, a constant resistance value. A triangular circuit is alternatively also conceivable. The changeover switches 30 are linked in such a way to the outputs of the machine-side pulse current converter 22 and to the inputs of the permanently excited synchronous motor 6 such that the inputs of the permanently excited synchronous motor 6 can be connected on one side to the braking resistor 28 and on the other side to the outputs of the machine-side pulse current converter 22.

These changeover switches 30, which are also referred to as failsafe switches, can be activated electrically or mechanically or pneumatically. As soon as these changeover switches 30 have moved from the "drive" operating position, i.e., the terminals of the permanently excited synchronous motor 6 are connected to the outputs of the machine-side pulse current converter 22, into the "brake" operating position, i.e., the terminals of the permanently excited synchronous motor 6 are connected to the braking resistors 28 connected in the star configuration, the permanently excited synchronous motor 6 generates a braking torque which changes in accordance with the profile of the braking characteristic curve as the speed of the rail vehicle is reduced. Neither the machine-side pulse current converter 22 nor any kind of regulating means is required to generate the braking torque.

Such a traction drive 1 is described in detail in the above-mentioned DE 101 60 612. For this reason, no further details regarding this traction drive are provided herein.

The regenerative brake device 8 based on the permanently excited synchronous motor may form a safety brake or emergency brake that is subordinate to a service brake as a protection level. To implement the safety brake or emergency brake, the regenerative brake device 8 can interact with a safety loop of the rail vehicle or of the combination of rail vehicles in such a way that after a variable conducted along the safety loop has exceeded or undershot a limiting value, the permanently excited synchronous motor 6 is connected to the load circuit.

Figure 2:
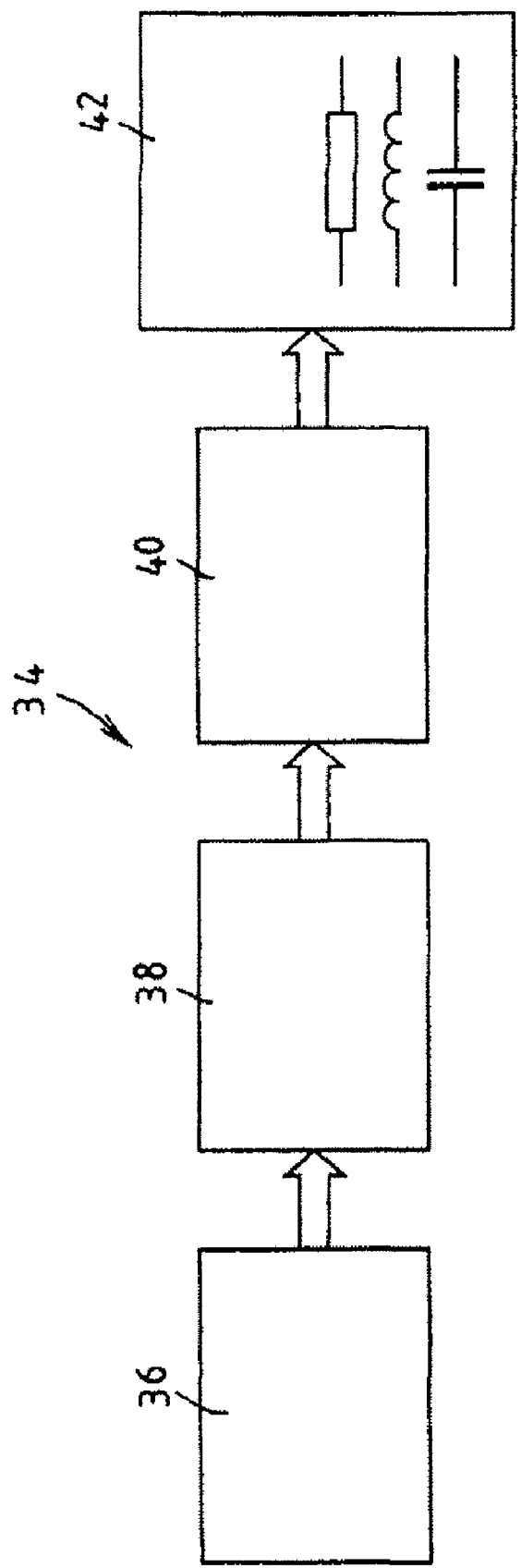
FIG. 2 is a general block circuit diagram of a device for correcting loads during regenerative braking of rail vehicles or combinations of rail vehicles which are equipped with a traction drive of the type in FIG. 1.

In contrast to the conventionally known traction drive according to FIG. 1, in the invention, a device 34 for correcting loads during the regenerative braking of rail vehicles or combinations of rail vehicles is provided which, according to FIG. 2, generally comprises the following assemblies: a load-sensing device 36 for generating loading-dependent load signals and a transmission device or control device 38 for processing the load signals and for modulating actuating signals for at least one actuator 40 for switching over or adjusting load elements 42 of the load circuit 32 (resistors, capacitors and inductors) as a function of the load signals.

Figure 3:
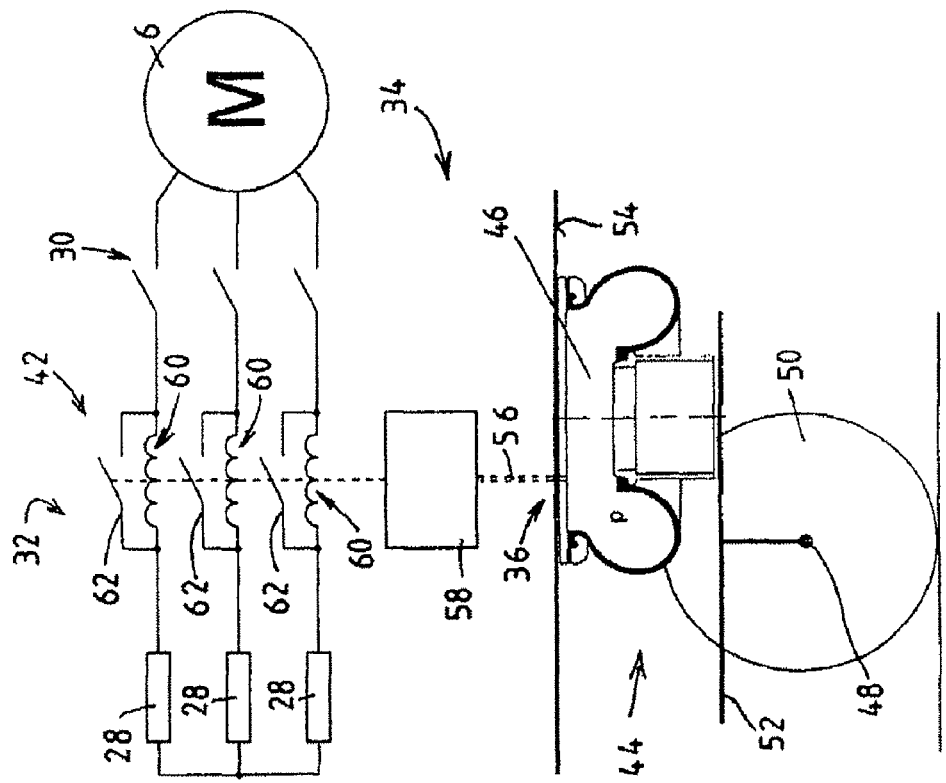
FIG. 3 is a schematic illustration of an embodiment of the device for correcting loads during regenerative braking of rail vehicles or combinations of rail vehicles.

The device 34 for correcting loads during regenerative braking may be used in a rail vehicle or combination of rail vehicles containing an air spring device 44 with at least one air spring bellows 46. Further detail of such an air spring device 44 is illustrated in FIG. 3. Here, the wheels 50 which are mounted on an axle 48, for example, of a bogie 52 of the rail vehicle, are spring mounted by means of an air spring bellows 46 with respect to a wagon body 54. This air spring bellows 46 may be assumed as being illustrated by way of example for a plurality of air spring bellows of the air spring device 44.

In the air spring bellows 46, there is a loading-dependent pressure p. Within the scope of the sensing of loads, the bellows pressure p present in the air spring bellows 46 is used as the load signal and is fed directly, via a pneumatic line 56, as an actuating signal into a pneumatic pressure switch 58, having, e.g., two switched positions, as an actuator for incrementally switching over or connecting into the circuit load elements 42 of the load circuit 32. Apart from the unavoidable pressure losses due to friction within the line 56, the pneumatic line 56 does not change the bellows pressure p as a load signal and actuating signal, with the result that this line 56 constitutes a transmission device 38 within the sense of the invention.

The load circuit 32 has, according to the embodiment in FIG. 1, resistors 28 and in addition, for example, one or more inductors 60 arranged in series with respect to the resistors 28, with the pressure switch 58 being controlled as a function of the bellows pressure p in such a way that the pressure switch reduces the inductance as the loading increases, and increases the inductance as the loading decreases. For this purpose, the pressure switch 58 connects the inductors 60 with respect to the resistors 28 when the loading decreases, and disconnects them when the loading increases. It is also conceivable to have a pressure switch 58 which has more than two switching stages and which connects or disconnects a plurality of inductors 60, arranged in series with the resistors 28, in a plurality of steps as a function of the loading, to adapt the braking torque in an incremental fashion as a function of the load.

For this purpose, the inductors 60 are bypassed by, in each case, one bypass branch 62 connected in parallel. If a plurality of inductors 60 is present, a corresponding number of bypass branches 62 would then be present. When the bypass branch 62 is open, the current flows through the inductors 60, which are bypassed when the switching branch 60 is closed, with the result that only the resistors 28 and a few inductors 60 are still active in the load circuit 32. Furthermore, it is also conceivable to have a load circuit 32 which, instead of the inductors 60 or in addition to them, has capacitors which can be connected and disconnected and are arranged in parallel with respect to the resistors 28.

Increasing the inductance within the load circuit 32 (e.g., by connecting inductors 60 for example from zero) leads to a reduction in the maximum braking torque, while reducing the inductance results in an increase in the maximum braking torque. Consequently, when the load is low or when the rail vehicle is empty, braking is carried out with a lower braking torque than the high maximum braking torque that can theoretically be used and corresponds to a first switched position of the pressure switch 58 (in which switched position the bypass branches 62 are opened and accordingly the current flows via the inductors 60 which are then active).

In contrast, the maximum braking torque which can be achieved is increased by reducing the inductance when the rail vehicle or the combination of rail vehicles is laden, which corresponds to the second switched position of the pressure switch 58 shown in FIG. 3 (in which switched position the bypass branches 62 are closed and the inductors 60 are bypassed, in which case the current flows via the bypass branches 62). In this case, the inductance in the load circuit 32 is consequently equal to zero, but incrementally reduced inductance by disconnecting individual inductors 60 is also possible if a plurality of such inductors 60 are connected in series with the respective resistor 28.

Figure 4:
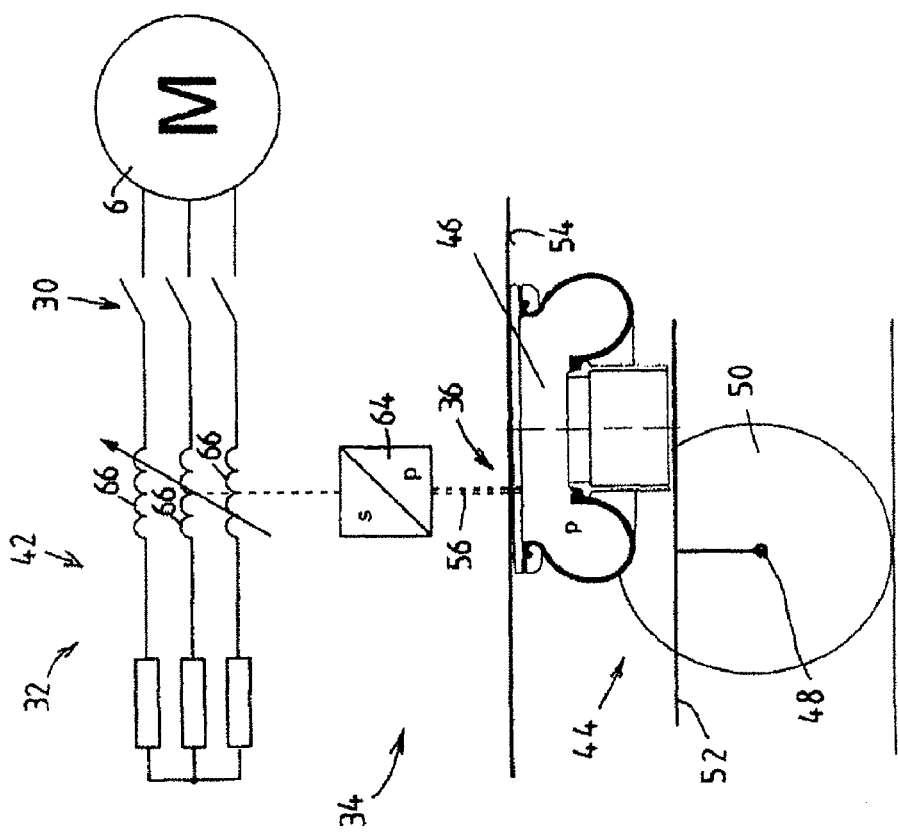
FIG. 4 is a schematic illustration of a further embodiment of the device for correcting loads during regenerative braking of rails vehicles or combinations of rail vehicles.

According to a further embodiment shown in FIG. 4, within the scope of the sensing of loads, the bellows pressure p in the air spring bellows 46 is also used as a load signal and is fed directly, via the pneumatic line 56, as an actuating signal into a pneumatic actuator 64 for infinitely variable adaptation, as a function of the loading, of inductors 66 also arranged in series with the resistors 28. To permit infinitely variable adjustment of the inductors 66, they are embodied, for example, as magnetic coils and have a multi-component coil core, with part of the coil core being adjustable with respect to a static part of the coil core by means of the pneumatic actuator 64, in such a way that the clear width of an air gap located between the two parts of the coil core (and therefore also the inductance) changes. As a result, the pneumatic actuator 64 adjusts the inductance of the load circuit 32 in an infinitely variable fashion and as a function of the loading.

The invention is not restricted to traction drives of vehicles which are fed by an alternating current circuit but rather can also be applied in traction drives of vehicles with permanently excited synchronous motors which are fed by a direct current network such as are described, for example, in DE 101 606 12.

The invention claimed is:

1. A traction drive for driving and for performing regenerative braking of a rail vehicle or of a combination of rail vehicles, the traction drive comprising:
    at least one permanently excited synchronous motors;
    one traction current converter assigned to at least one axle of the rail vehicle or of the combination of rail vehicles, wherein the traction current converter has at least one machine-side pulse current converter; and
    a changeover switch connected to the terminals of the permanently excited synchronous motor in such a way that the permanently excited synchronous motor is selectively connected to the pulse current converter to perform driving or to a load circuit containing a load to perform regenerative braking,
    wherein the load circuit connected to the permanently excited synchronous motor to perform regenerative braking is configured in such a way that the characteristic variables of the load circuit can be changed as a function of the loading of the rail vehicle or of the combination of rail vehicles.

2. The traction drive of claim 1, wherein the load circuit has resistors and inductors and/or capacitors.

3. The traction drive of claim 2, wherein the changing of the resistance, inductance or capacitance takes place in an incremental or infinitely variable fashion.

4. The traction drive of claim 2, wherein the actuator contains a switching device which connects or disconnects the inductors and/or capacitors with respect to the resistors as a function of the loading.

5. The traction drive of claim 2, wherein the load circuit has inductors which are arranged in series with respect to the resistors, wherein a transmission device or control device controls at least one actuator as a function of the loading in such a way that said actuator reduces the inductance of the load circuit as the loading increases and increases the inductance of the load circuit as the loading decreases.

6. The traction drive of claim 5, wherein the switching device has means for bypassing the inductors.

7. The traction drive of claim 3, wherein the inductors contain magnetic coils, and the actuator adjusts the inductors in an infinitely variable fashion by changing the magnetic circuit as a function of the loading.

8. The traction drive of claim 1, wherein the regenerative brake based on the permanently excited synchronous motor forms a safety brake or emergency brake subordinate to a service brake.

9. A device for correcting loads during the regenerative braking of rail vehicles or combinations of rail vehicles containing an air spring device with at least one air spring bellows, by a traction drive as claimed in claim 1, wherein the actuator is formed by a pneumatic actuator controlled directly by pressure p in at least one air spring bellows, and connects or disconnects or adjusts in an infinitely variable fashion the inductors and/or capacitors with respect to the resistors as a function of this pressure p and as a function of the loading.

10. The device of claim 9, wherein the pneumatic actuator is formed by a pressure switch controlled by the pressure p in the at least one air spring bellows.

11. The device of claim 10, wherein the pneumatic actuator adjusts the magnetic circuit of the inductors in an infinitely variable fashion as a function of the loading.

12. The device of claim 11, wherein the pneumatic actuator adjusts the size of an air gap between coil core parts of coil cores of the inductors in an infinitely variable fashion as a function of the loading.

* * * * *